United States Patent [19]

Elsworth

[11] 4,132,641
[45] Jan. 2, 1979

[54] FILTER ASSEMBLY AND METHOD OF FILTERING

[75] Inventor: Robert M. Elsworth, Loudonville, N.Y.

[73] Assignee: General Electric Company, Waterford, N.Y.

[21] Appl. No.: 773,698

[22] Filed: Mar. 2, 1977

Related U.S. Application Data

[63] Continuation-in-part of Ser. No. 591,691, Jun. 30, 1975, abandoned.

[51] Int. Cl.² .............................................. B01D 37/00
[52] U.S. Cl. .................................. 210/73 R; 210/238; 210/440; 210/443; 210/489
[58] Field of Search ............... 210/437, 440, 441, 443, 210/451, 455, 457, 473, 497, 73 R, 238, 489; 55/410, 411

[56] References Cited

U.S. PATENT DOCUMENTS

| | | | |
|---|---|---|---|
| 898,545 | 9/1908 | Barnes | 210/440 X |
| 1,152,831 | 9/1915 | Monteagle | 210/443 |
| 1,436,294 | 11/1922 | Scott | 210/497 X |
| 1,616,577 | 2/1927 | Janette | 210/443 X |
| 2,242,807 | 5/1941 | Austin | 210/473 X |
| 2,352,732 | 7/1944 | Nugent | 210/440 X |
| 2,354,481 | 7/1944 | Russell | 210/443 X |
| 2,379,582 | 7/1945 | Kracklauer | 210/441 X |
| 2,709,524 | 5/1955 | Russell et al. | 210/441 X |
| 2,855,104 | 10/1958 | Wilkinson | 210/440 X |
| 3,289,847 | 12/1966 | Rothemund | 210/440 X |
| 3,456,799 | 7/1969 | Musial | 210/437 X |

OTHER PUBLICATIONS

Albany Engineered Systems, Albany Felt Co. Bulletin F-3, May 20, 1975.
Chemical Processing, Jan. 1973, "Viscosity Of One Million cp Handled By Tubular Filters At GE."
Albany Engineered Systems, Albany Felt Co., Bulletin F-1, May 20, 1975.

Primary Examiner—Richard L. Chiesa
Attorney, Agent, or Firm—Morgan, Finnegan, Pine, Foley & Lee

[57] ABSTRACT

A high pressure filter comprises an elongated casing having an inlet and an outlet at the upper end thereof and a filter basket assembly mounted within the casing at a predetermined distance from the walls of the casing. The filter basket assembly comprises a fine mesh screen rolled on its short length and encompassing a central passage through which fluid from the inlet is directed and a perforated tube into which said screen is inserted. The fluid flows from the central passage through the filter screen and tube and along the casing to the outlet. A handle assembly fits over the upper end of the perforated tube and is joined to a base in an integral unit by means of an elongated rod extending the length of the tube to permit ease of replacement.

18 Claims, 3 Drawing Figures

FILTER ASSEMBLY AND METHOD OF FILTERING

CROSS-REFERENCE TO RELATED APPLICATION

This application is a continuation-in-part of U.S. application Ser. No. 591,691 filed June 30, 1975, now abandoned. This invention relates to a filter which provides a fluid flow from the inside to the outside of the filter assembly. More particularly, it relates to an inexpensive high pressure filter of the basket type which is suitable for filtering products under pressure drops across the filter screen ranging up to about 1,000 p.s.i., with only a specific structural design limiting the maximum pressure.

BACKGROUND OF THE INVENTION

In the production of materials such as high quality silicone sealant base, a one component thixotropic material having a viscosity up to 1,000,000 centipoises, it is conventional to use a tubular or basket type filter system. These filters help to assure the smoothness and the uniformity of the silicone material. In filter designs of the prior art, the acceptable pressure drop across filter screens has been limited to under 240 pounds due to limitations of the filter design. Furthermore, the open passages are a minor part, generally less than 8% of the surface of the filter because of the structural material arrangement.

The prior art filters are also generally designed to pass fluids from the outside to the inside of the filter basket assembly and then upwardly through the outlet of the filter. A typical design would comprise a high pressure wire wound spiral of approximately 0.050 square spaced 0.002 inches to 0.006 inches apart with reinforcement every ⅜ inches on the inside. This design would permit a mass of 0.002–0.006 inches by ⅜ inches wide to pass through the filter, resulting in a rather poor filtration.

The present invention comprises an improved filter which includes a filter basket assembly wherein the fluid flow is from the inside to the outside of the assembly in contrast to the prior art. Under inside to outside flow conditions a filter screen can endure greater stress than it would under outside to inside flow conditions. This is due to what is known as "hoop stress phenomenom," i.e., that a hoop configuration can sustain under tension forces that would cause failure under compression. The filtering element comprises a flat elongated screen rolled on its shorter dimension and inserted into a perforated tube. A top handle assembly and a base are coupled to the perforated tube at the respective ends thereof by means of an elongated rod which extends longitudinally within the tube in order to hold the assembly together.

The filter assembly has the advantage of a substantially greater passage surface area than known filters, having open passages that are as much as 60% of the filter surface. It also limits the particle passage to a size equal to the mesh openings, thereby insuring smoothness and uniformity of the product. Furthermore, the filter is suitable for applications where the pressure drop across the filter screen ranges up to about 1,000 p.s.i., and it has the additional advantage of using a filter screen that is simple and inexpensive to manufacture and is readily replaceable or reusable over a period of time.

SUMMARY OF THE INVENTION

Figure 1:
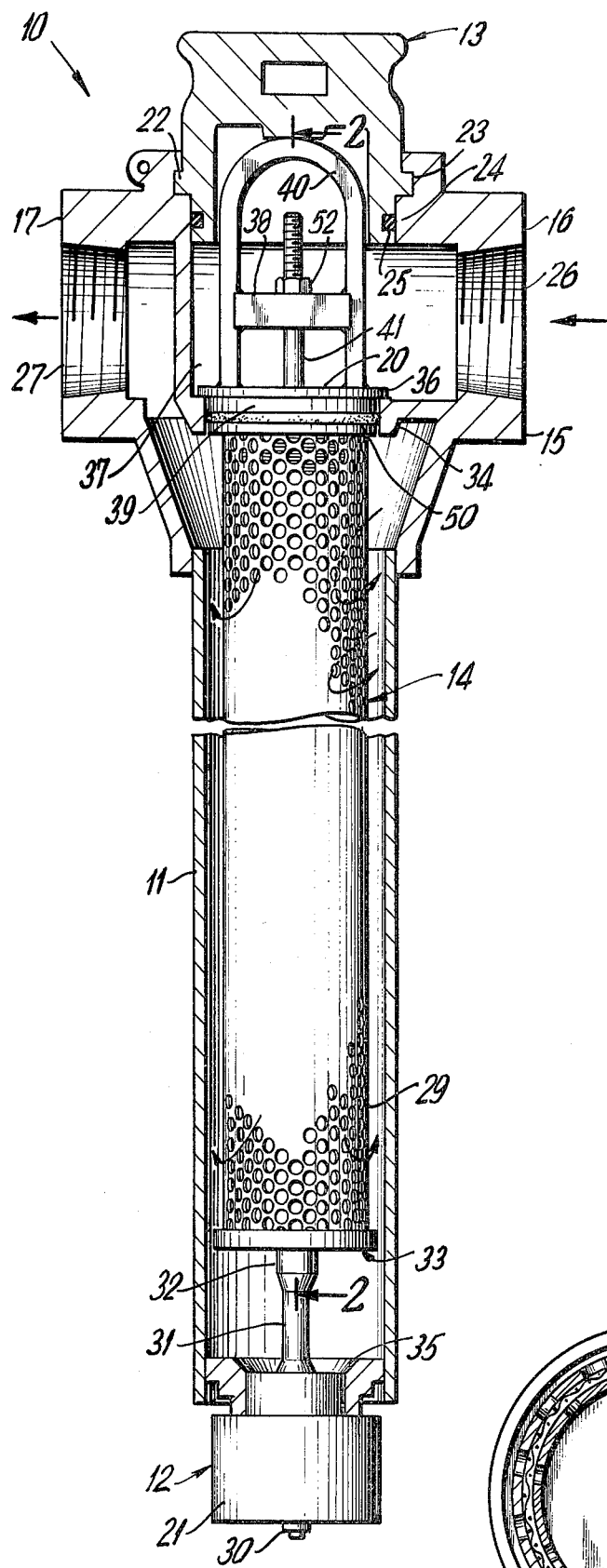
FIG. 1 depicts a cut-away view of the filter apparatus comprising the invention.
Figure 2:
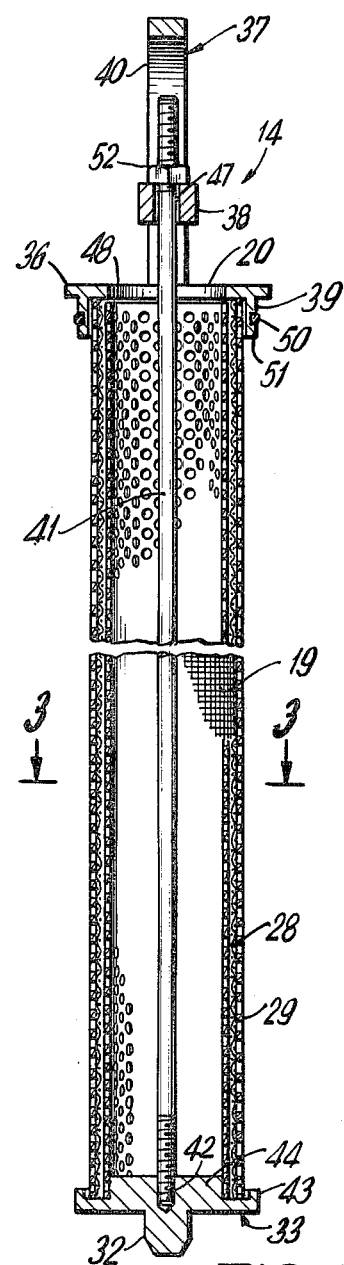
FIG. 2 illustrates a lateral cross-sectional view of the filter basket assembly.
Figure 3:
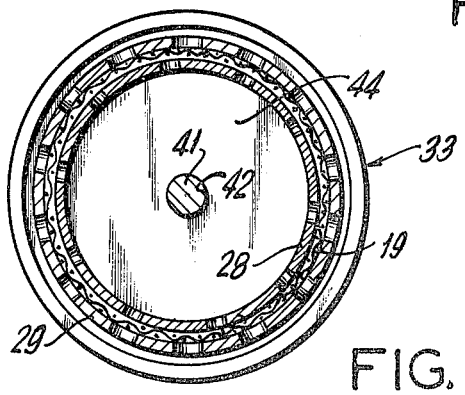
FIG. 3 is a cross-sectional view of the filter basket assembly.

According to the present invention, there is provided a new and improved filter assembly comprising an outer casing having an elongated body portion and an inlet and outlet portion at the upper portion thereof, a cap for said casing and a bottom drain portion. A filter basket assembly comprising a rolled screen and a surrounding perforated tube is mounted within the casing. Optionally, a second perforated tube may be located within the rolled screen. An upper handle assembly and base portion are connected at the opposite ends of the perforated tube by means of an axially extending rod to form an integral unit. The rolled filter screen is of a cylindrical configuration defining an opening into which the product is directed from the inlet. The product flows through the filter screen and perforated tube to the casing wall and then upwardly through the outlet portion of the filter assembly. This inside to outside flow through the filter permits higher pressures and superior filtering. The filter elements are also less costly than present commercial filters, and further economies are realized since fewer filter element changes are required. Clogged or dirty filters may be reused by washing in a special back-up washing machine which flushes the contaminant off the screens and collects the dirt on other filters in the washer.

DETAILED DESCRIPTION OF THE INVENTION

Referring to the drawings, the invention comprises a filter assembly 10 including an outer casing 11 with a top housing 15 mounted thereon. A base or drain portion 12 and a top cap 13 enclose the bottom of the casing 11 and the top of the housing 15, respectively. A replaceable filter basket assembly 14 having a filter screen 19 is mounted within the casing 11. The top housing 15 includes an internally threaded inlet portion 16 and an outlet portion 17 spaced therefrom at the upper end of an elongated casing of substantially cylindrical configuration. The inlet and outlet apertures, 26 and 27, are in line with the axis thereof, perpendicular to the axis of the casing 11. The threaded apertures 26 and 27 are connected to the fluid lines (not shown).

The filter basket assembly 14 comprises a handle assembly 37, a base 33 and a rolled screen 19 which can, for example, be a predetermined spiral wound element or, preferably, a mesh screen which is rolled into a cylindrical configuration.

The screen 19 is inserted either into a single perforated tube or between two concentrically mounted perforated tubes, inner perforated tube 28 and outer perforated tube 29. The use of a second perforated tube permits outside to inside operation at lower pressures, such as below about 500 p.s.i. pressure drop across the screen, and back washing of the filter screen at high pressure. The perforations of tube 28 are aligned with those of tube 29.

Screen 19 will become clogged during use. Under inside to outside flow conditions, screen 19 will, as it clogs, press against outer tube 29 so that tube 29 expands slightly. Screen 19 will slip on itself to adjust for the resulting increase in diameter, absorbing stress that would otherwise be transmitted to the mesh or seam in a fixed screen. If the filter assembly should be operated under outside to inside flow conditions, screen 19 will press against inner tube 28, tube 28 compressing slightly and screen 19 slipping on itself to adjust to the decrease in diameter.

Perforated tubes 28 and 29 are mounted to the handle assembly 37 and base 33 at their respective ends and secured thereto by means of an elongated rod 41 which extends through tubes 28 and 29 to engage the handle 37 and the base 33. In the filtering operation, the fluid flows from the inlet 16 into the opening 20 defined by the screen 19 and perforated tubes 28 and 29 and along walls of the casing 11 to the outlet 17. The filter assembly 10 with its inside to outside flow and structural arrangement as thus described is capable of withstanding pressure drops across the filter screen of up to approximately 1,000 p.s.i.

In greater detail, a top cap 13 is secured to the upper portion of housing by means of protrusions 22 on the cap 13 which engage a mating recess 23. This arrangement provides a convenient ¼ turn cap for ready access to the basket assembly 14. An effective seal is established by o-ring 24 mounted within recess 25 in the cap 13 and engaging the upper portion of the housing 15.

The bottom drain portion or base 12 includes a pipe cap 21 and plug 30 which are mounted to the casing 11 so that fluid can be drained over the sloped filter bottom 35 and out of the assembly 10. An upwardly extending holding means 31 is also provided to engage a protruding element 32 on the lower portion of the basket assembly base 33. The filter basket assembly 14 is held in place at its upper end by a ledge portion 34 of housing 15 which engages the lower projection portion 36 of the basket handle assembly 37. An effective seal between assembly 37 and ledge portion 34 is established by o-ring 50 mounted in recess 51.

The filter basket assembly 14 includes a basket handle assembly 37 as mentioned above and a base 33 which mount to the perforated tubes 28 and 29 at their respective ends. The basket handle assembly 37 comprises an inverted U-shaped upper member or handle 40 which is readily grasped to withdraw the assembly 14 from the casing 11, a cross member 38 joining the legs of the U-shaped member 40 and a bottom portion 39 from which the legs extend upwardly. The bottom portion 39 has a central aperture 48 for mounting over the perforated tubes 28 and 29 while the cross member 38 includes an aperture 47 which is engaged by elongated rod 41. The rod 41 extends axially through the casing 11 and engages a threaded aperture 42 in the base 33 to make the assembly 14 an integral unit. The upper portion of rod 41 engages a threaded nut 52. The base 33 also includes a recess 43 to support tubes 28 and 29 and screen 19, and a flat portion 44 projecting upwardly from the base 33.

In operation, the filter assembly 10 is coupled into a fluid line (not shown) with the inlet and outlet apertures 26 and 27 engaging the line. The fluid flows through the inlet and then downwardly into the filter basket assembly 14. The fluid is filtered as it passes through the screen 19 and perforated tubes 28 and 29 to the casing wall. The fluid then flows as indicated by the arrows in the drawings upwardly and outwardly through the outlet aperture 27. This inside to outside fluid flow leaves a filter cake on the inside of the screen 19. The ¼ turn cap 13 is periodically removed and the basket assembly 14 is lifted from the casing 11 to change the filter screen 19. A new assembly 14 is then inserted into the casing 11 while the caked screen 19 is washed for future use. The ease and convenience of changing the filter element is thus an important feature of the subject design.

The filter screen 19 is selected to provide the desired filtration for the particular application. The screen may, for example, be a 100 × 100 mesh screen of 0.0045 inch diameter stainless steel wire in filtering fluids such as a silicone sealant base where the viscosity ranges up to 1,000,000 centipoises. A typical screen 19 would be approximately 6¼ inches wide by 24 inches long which would be rolled on its shorter dimension and inserted into a 2 inch diameter perforated tube. The screen arrangement as thus described is considerably less expensive than commercially available screens and may be used for a longer period of time before replacement.

The construction as shown as the further substantial advantage of permitting the screen to move under pressure against the supporting wall and also to press against the overlap to form a seal. This eliminates the need for welding or soldering joints which will transfer stresses to fine screens.

While the invention has been explained by a detailed description of certain specific embodiments, it is understood that various modifications and substitutions can be made in any of them within the scope of the appended claims which are intended also to include equivalents of such embodiments.

I claim:

1. A method for filtering high viscosity fluids which comprises the steps of:
   (a) causing a high viscosity fluid to flow under high pressure, and
   (b) directing the high viscosity fluid under high pressure to an elongated housing having at the upper portion thereof an inlet aperture for receiving all the high viscosity fluid under high pressure, said inlet and outlet apertures being located on an axis perpendicular to the elongated axis of said housing, and a replaceable filter basket assembly mounted within said housing including a perforated tube, a handle assembly, a base mounted to the respective ends of the tube, and a substantially cylindrical filter screen positioned within the tube, said base forming a continuous closure for said basket assembly and said filter screen comprising a rolled, slidably overlapping, fine mesh screen, further directing fluid flow for filtering from the inlet aperture into the center of the basket assembly, through the screen and surrounding perforated tube, and then through the outlet aperture, and producing a high pressure drop across the filter screen.

2. A filter assembly for filtering high viscosity fluids comprising:
   (a) means causing a high viscosity fluid to flow under high pressure, and
   (b) an elongated housing having at the upper portion thereof an inlet aperture receiving all said high viscosity fluid under high pressure and an outlet aperture discharging said high viscosity fluid, said inlet and outlet apertures being located on an axis perpendicular to the elongated axis of said housing, and a replaceable filter basket assembly mounted within said housing including a perforated tube, a handle assembly, a base mounted to the respective ends of the tube, and a substantially cylindrical filter screen positioned within the tube, said base forming a continuous closure for said basket assembly and said filter screen comprising a rolled, slidably overlapping, fine mesh screen, wherein the direction of fluid flow for filtering is from the inlet aperture into the center of the basket assembly, through the screen and surrounding perforated tube, and then through the outlet aperture and wherein there is a high pressure drop across the filter screen.

3. The filter assembly of claim 2 wherein the filter basket assembly further includes an elongated rod mounted to the base at one end and to the handle assembly at the other end to form an integral unit with the perforated tube and filter screen, said unit being capable of operation under high pressure conditions for prolonged periods.

4. The filter assembly of claim 3 further including a cross member located intermediate the handle assembly and base and extending transversely to the elongated rod between the walls of the casing and having a central aperture engaged by the rod.

5. The filter assembly of claim 3 wherein the handle assembly includes a bottom portion having an aperture engaged by the perforated tube and a handle having the configuration of an inverted "U" extending upwardly from the base and a cross member extending transversely between the legs of the "U" and having an aperture engaged by the elongated rod to join the assembly in an integral unit.

6. The filter assembly of claim 3 wherein the base comprises a ledge portion for supporting the bottom of the perforated tube, a portion extending upwardly from the ledge to engage the tube and screen, a threaded recess on the upward portion to engage the rod, and a downwardly projecting positioning portion to engage the housing.

7. The filter assembly of claim 3 wherein the filter screen comprises an elongated screen of fine mesh rolled on its shorter dimension for insertion into the perforated tube.

8. The filter assembly of claim 3 wherein the filter screen comprises a fine mesh screen of rectangular configuration, said screen having been rolled on its shorter dimension and inserted into the perforated tube, and wherein said screen is capable of withstanding pressure drops across the screen in the range of about 1,000 p.s.i.

9. The filter assembly of claim 3 wherein the housing comprises an elongated casing, a bottom drain portion mounted at one end of the casing, and an upper housing mounted at the other end, said upper housing having an inlet aperture and an outlet aperture on the opposite sides thereof, a top aperture, and a cap for engaging the top aperture.

10. The filter assembly of claim 9 wherein the upper housing includes a ledge extending inwardly from the base of the inlet aperture and a portion extending downwardly from the upper surface of the outlet aperture and having a bottom ledge thereon, said ledges supporting the handle assembly and said downwardly extending portion at the outlet directing the fluid flow downwardly into the basket assembly.

11. The filter assembly of claim 9 wherein the top cap comprises a ¼ turn cap having projections thereon and the housing includes a recess engaged thereby.

12. The filter assembly of claim 9 wherein the bottom drain portion comprises a recessed portion at its upper end for engaging the base of the basket assembly and a pipe cap and plug assembly mounted to casing at its lower end to permit draining the filter assembly.

13. The filter assembly of claim 2 wherein the filter basket assembly includes two concentrically mounted perforated tubes and the substantially cylindrical filter screen is positioned between the two tubes.

14. A filter assembly for fluids under pressure comprising:
means causing a high viscosity fluid to flow under high pressure;
an elongated housing having an inlet aperture receiving said fluids and an outlet aperture discharging said fluids at the upper portion thereof, said inlet and outlet apertures being located on an axis perpendicular to the elongated axis of said housing, and,
a replaceable filter basket assembly mounted within said housing including two concentrically mounted perforated tubes, a handle assembly, a base mounted to the respective ends of the tubes, and a substantially cylindrical filter screen positioned between the tubes, said base forming a continuous closure for said basket assembly and said filter screen comprising a rolled, slidably overlapping, fine mesh screen, wherein the direction of fluid flow for filtering is from the inlet aperture into the center of the basket assembly, through the screen and perforated tubes, and then through the outlet aperture and wherein there is a high pressure drop across the filter screen and perforated tubes.

15. The filter assembly of claim 14, wherein the filter basket assembly further includes an elongated rod mounted to the base at one end and to the handle assembly at the other end to form an integral unit with the perforated tubes and filter screen, said unit being capable of operation under high pressure conditions for prolonged periods.

16. The filter assembly of claim 15 wherein the base comprises a ledge portion for supporting the bottoms of the perforated tubes, a portion extending upwardly from the ledge to engage the tubes and screen, a threaded recess on the upward portion to engage the rod, and a downwardly projecting positioning portion to engage the housing.

17. The filter assembly of claim 15 wherein the filter screen comprises an elongated screen of fine mesh rolled on its shorter dimension for insertion between the perforated tubes.

18. The filter assembly of claim 15 wherein the filter screen comprises a fine mesh screen of rectangular configuration, said screen having been rolled on its shorter dimension and inserted between the perforated tubes, and wherein said screen is capable of withstanding pressure drops across the screen in the range of about 1,000 p.s.i.

* * * * *